UNITED STATES PATENT OFFICE.

AUGUSTUS LAFEVER, OF BATTLE CEREK, MICHIGAN.

BOARD-MEASURER.

Specification of Letters Patent No. 25,423, dated September 13, 1859.

*To all whom it may concern:*

Be it known that I, AUGUSTUS LAFEVER, of Battle Creek, in the county of Calhoun and State of Michigan, have invented a new and Improved Device for Measuring Boards and other Lumber; and I do hereby declare that the following is a full, clear, and exact description of the same, reference being had to the annexed drawings, making a part of this specification, in which—

Figure 1, is a face view of my invention. Fig. 2, is an internal view of ditto, taken in the line $x$, $x$, Fig. 4. Fig. 3, is an internal view of ditto, taken in the line $y$, $y$, Fig. 4. Fig. 4, a plan or top view of ditto. Fig. 5, a detached inner side view of the face plate of ditto.

Similar letters of reference indicate corresponding parts in the several figures.

The object of this invention is to obtain a portable instrument or device by which the aggregate number of square feet in a lot of lumber composed of pieces of varying lengths and thicknesses may be ascertained by simply passing the instrument transversely over the pieces in the direction of their width, the instrument being capable of adjustment to suit the length and thickness of the pieces.

To enable those skilled in the art to fully understand and construct my invention I will proceed to describe it.

A, represents a square or quadrilateral case, the front or face side of which is provided with three graduated dials, $a$, $b$, $c$, the plate $a$, being graduated into tens, the plate $b$, into hundreds and $c$, into thousands, as shown clearly in Fig. 1.

B, is a stop lever which is secured within the case A, by a fulcrum pin $d$. This lever has an arm C, attached to it, which arm projects down through the bottom of the case A, a spring $e$, which is connected to the inner end of the lever B, having a tendency to keep the outer end forced down and out of the case, see Figs. 2 and 3. One end of the stop lever is of hook-form, as shown at $f$, and this hook catches on a projection $g$, on a lever D, which serves as a guide in starting the device or applying it properly to its work. A spring $h$, is attached to the lever D, which spring has a tendency to keep the projection $g$, within the hook $f$, as shown in Fig. 2.

E′, is a pinion within the case A, the shaft of which has a screw $i$, on it that gears into a pinion $j$, on a shaft $k$, said shaft having a toothed wheel $l$, on it which wheel gears into one of the wheels of a cone of gears E, shown in Fig. 2. The axis of the cone E, is fitted in permanent bearings $m$.

F, is a sliding pinion which is placed on a shaft G, within the case A. The bearings of the shaft G, are attached to a yielding frame H, which is fitted between proper guides or pins $n$, and has a spring I, attached to it, said spring having a tendency to keep the pinion F, in gear with the cone E. One of the bearings $o$, of the shaft G, is attached to a pivoted piece $p$, of the frame, as shown clearly in Fig. 3, so that an independent play or movement is allowed said bearing. The end of the shaft G, adjoining the bearing $o$, has a pinion $q$, placed on it and this pinion gears into a pinion $r$, which is placed on the axis of a cone of gears J, see Fig. 2. The axis of the cone J has its bearings attached to a yielding frame K, fitted between suitable guides or pins $s$, said frame K, having a spring $t$, attached to it which spring has a tendency to keep the cone J, in gear with a sliding pinion L, on a shaft M, the journals of which are fitted in permanent bearings.

The sliding pinion F, on the shaft G, has a collar $u$, attached to one side of it and this collar has a forked arm $v$, fitted on it, said arm being attached to a slide N, which works against the under side of the top plate of the case and has a thumb piece $w$, attached to it. The upper surface of the slide N, is graduated and its under side has a rack $a′$, formed on it, said rack bearing against a lever $b′$, which bears against a similar lever $c′$, connected with the frame H, of the shaft G, as shown at $d′$.

To the sliding pinion L, on shaft M, an arm O, is attached, said arm being connected to a slide P, which works against the under side of the top plate of the case A, and has a thumb piece $e′$, attached to it. The upper surface of the slide P, is graduated, and a rack $f′$, is formed on its under side, said rack bearing on a lever $g′$, which bears on a lever $h′$, connected with the frame K.

J. S. LASH.
Dumping-Wagon.
No. 25,424.
Patented Sept. 13, 1859.
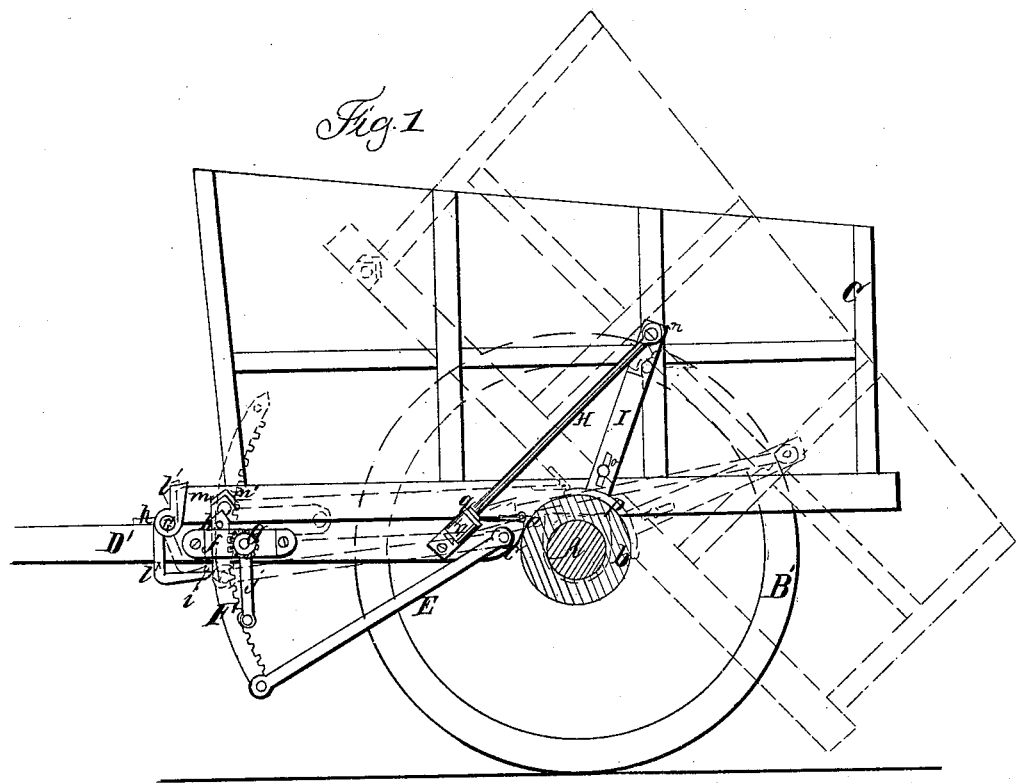
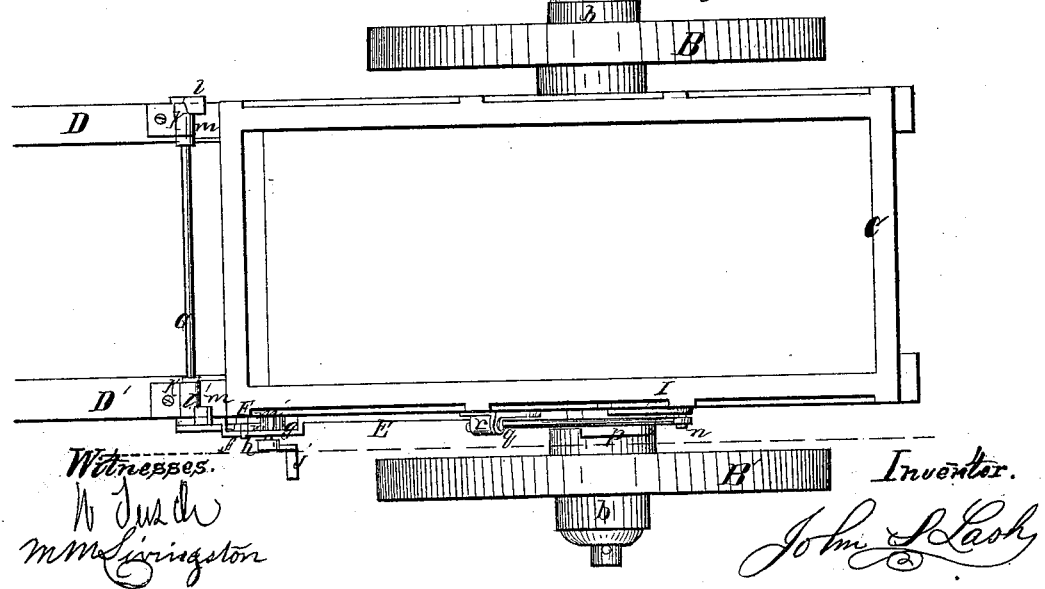

On the shaft M, a screw Q, is placed permanently. This screw gears into a pinion R, which sets in motion a train of gear S, so arranged as to operate the indexes $i′$, $j′$, $k′$, and cause the same to move over the graduated plates $a$, $b$, $c$, with a proper relative speed.